(12) United States Patent
Onuki

(10) Patent No.: US 7,441,912 B2
(45) Date of Patent: Oct. 28, 2008

(54) VEHICLE OUTSIDE MIRROR DEVICE

(75) Inventor: Hiroyasu Onuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 11/905,704

(22) Filed: Oct. 3, 2007

(65) Prior Publication Data

US 2008/0084623 A1  Apr. 10, 2008

(30) Foreign Application Priority Data

Oct. 4, 2006 (JP) ............... 2006-273094

(51) Int. Cl.
*G02B 7/182* (2006.01)
*B60R 1/06* (2006.01)

(52) U.S. Cl. ................. 359/841; 359/877

(58) Field of Classification Search ............. 359/841, 359/872, 873, 877
See application file for complete search history.

(56) References Cited

U.S. PATENT DOCUMENTS

| | | | |
|---|---|---|---|
| 4,681,409 A | 7/1987 | Enomoto | |
| 4,786,156 A * | 11/1988 | Kotani et al. | 359/872 |
| 4,919,526 A * | 4/1990 | Umekawa et al. | 359/841 |
| 4,981,349 A | 1/1991 | Tamiya et al. | |
| 5,172,884 A | 12/1992 | Ishiyama | |
| 5,369,530 A | 11/1994 | Yamauchi et al. | |
| 5,594,590 A * | 1/1997 | Ishiyama | 359/841 |
| 5,636,071 A * | 6/1997 | Mochizuki et al. | 359/877 |
| 5,781,354 A * | 7/1998 | Sakata | 359/841 |
| 6,022,113 A | 2/2000 | Stolpe et al. | |
| 6,679,610 B2 | 1/2004 | Yamauchi | |
| 6,793,358 B2 * | 9/2004 | Sakata | 359/872 |
| 6,811,270 B2 * | 11/2004 | Yoshida | 359/841 |
| 6,866,392 B2 | 3/2005 | Hayashi | |
| 6,871,969 B2 * | 3/2005 | Yamauchi et al. | 359/841 |
| 6,874,896 B2 * | 4/2005 | Yoshida | 359/841 |
| 6,923,547 B2 | 8/2005 | Yoshida et al. | |
| 7,104,660 B2 * | 9/2006 | Sakata et al. | 359/841 |
| 7,290,890 B2 * | 11/2007 | Yoshida et al. | 359/841 |
| 2006/0023326 A1 * | 2/2006 | Onuki | 359/879 |
| 2006/0238907 A1 * | 10/2006 | Onuki et al. | 359/877 |

FOREIGN PATENT DOCUMENTS

| | | |
|---|---|---|
| EP | 1 275 558 A2 | 1/2003 |
| EP | 1 445 150 A1 | 8/2004 |
| EP | 1 634 772 A2 | 3/2006 |
| JP | 2004-182117 A | 7/2004 |

OTHER PUBLICATIONS

U.S. Appl. No. 11/905,702, filed Oct. 3, 2007, Onuki.
U.S. Appl. No. 11/905,705, filed Oct. 3, 2007, Onuki.
H. Onuki, U.S. PTO Office Action, U.S. App. No. 11/905,705, Jun. 25, 2008, 8 pgs.

* cited by examiner

*Primary Examiner*—Ricky D Shafer
(74) *Attorney, Agent, or Firm*—Foley & Lardner LLP

(57) ABSTRACT

An outside mirror device for a vehicle includes a mirror assembly that is rotatably attached to a body of the vehicle through an electric retracting unit and a base. The electric retracting unit includes bearing portions at both ends of a first stage gear of a rotational force transmitting mechanism. The bearing portions are supported by bearing holes in the bearing member as a single member, respectively.

4 Claims, 13 Drawing Sheets

VEHICLE OUTSIDE MIRROR DEVICE

CROSS-REFERENCE TO RELATED APPLICATIONS

The present application claims priority to and incorporates by reference the entire contents of Japanese priority document, 2006-273094 filed in Japan on Oct. 4, 2006.

BACKGROUND OF THE INVENTION

1. Field of the Invention

The present invention relates to a vehicle outside mirror device.

2. Description of the Related Art

A conventional vehicle outside mirror device, such as the one disclosed in Japanese Patent Application Laid-open No. 2004-182117, includes a mirror assembly, a motor, a worm gear, and a bearing member. The worm gear is a first stage gear in a rotational force transmitting mechanism and is coupled to the motor. The bearing member includes two separate bearing members that rotatably support both ends of the worm gear, respectively. The worm gear is rotated by driving the motor, which leads to the rotation of the mirror assembly.

However, in the conventional vehicle outside mirror device, because the both ends of the worm gear are supported by the separate bearing members, respectively, an axial runout and an inclination of the worm gear may occur.

SUMMARY OF THE INVENTION

It is an object of the present invention to at least partially solve the problems in the conventional technology.

An outside mirror device for a vehicle, according to one aspect of the present invention, includes a mirror assembly that is rotatably attached to a body of the vehicle through an electric retracting unit and a base. The electric retracting unit includes a shaft holder that is fixed to the base, a shaft that is provided on the shaft holder, a casing to which the mirror assembly is attached, which is rotatably attached to the shaft, a motor that outputs a rotational force, a rotational force transmitting mechanism that transmits the rotational force to the mirror assembly, and a bearing member that rotatably supports a first stage gear of the rotational force transmitting mechanism coupled to a shaft of the motor. The first stage gear includes a gear portion having a fitting hole at a first end thereof, a pin that is fitted into the fitting hole, and a shaft portion provided at a second end of the gear portion. The bearing member includes bearing holes that support the shaft portion and the pin, respectively. The casing includes a pin retaining portion that prevents the pin from coming off.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
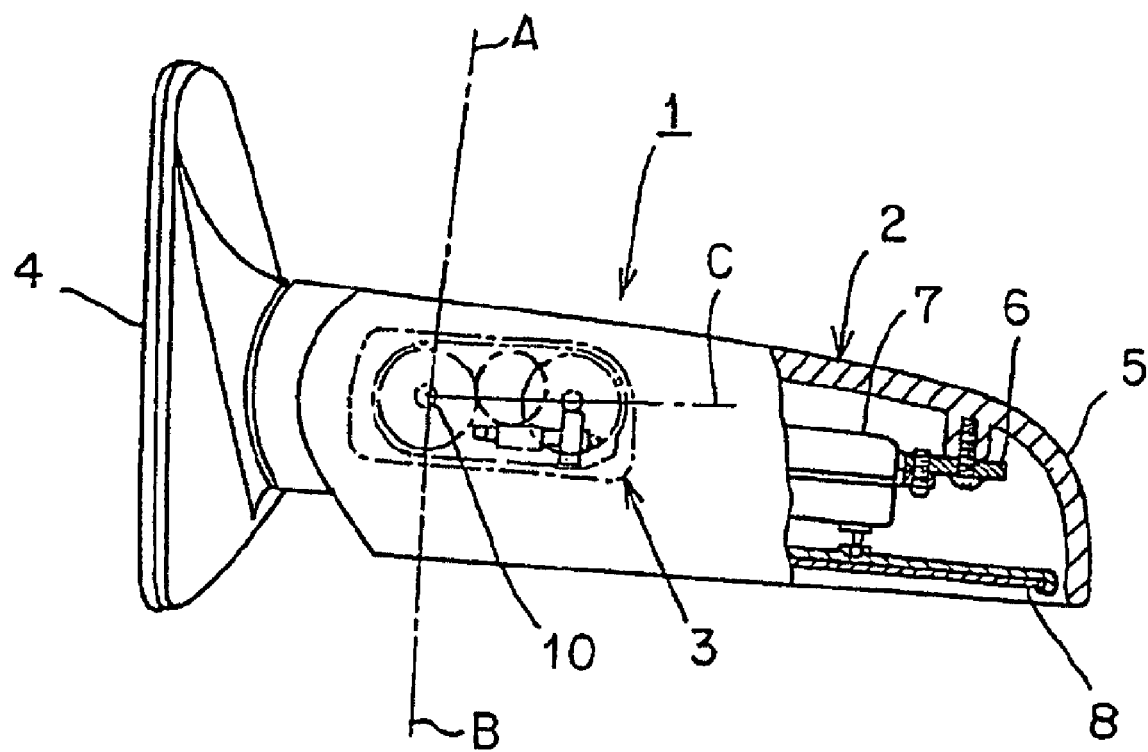
FIG. 1 is a schematic diagram of a vehicle outside mirror device according to an embodiment of the present invention.

FIG. 1 is a schematic diagram of an electric retractable door mirror device (hereinafter, "a door mirror device") 1 that is a vehicle outside mirror device according to an embodiment of the present invention. The door mirror device 1 is mounted on each of a driver side (right side) door (not shown) and a passenger side (left side) door (not shown) of a vehicle. The door mirror device 1 shown in FIG. 1 is mounted on the right door. A door mirror device mounted on the left side door has a configuration substantially symmetric to the door mirror device 1.

As shown in FIG. 1; the door mirror device 1 including a mirror assembly 2 is rotatably attached to a vehicle body (e.g., a door) (not shown) via an electric retracting unit 3 and a base 4 that is fixed to the door.

The mirror assembly 2 includes a mirror housing 5, an attachment bracket 6, a driving unit 7, and a mirror unit 8. The attachment bracket 6 is attached to the inside of the mirror housing 5, and the driving unit 7 is attached to the attachment bracket 6. The mirror unit 8 is attached to the driving unit 7 so that the mirror unit 8 inclined in the vertical and horizontal directions.

Figure 2:
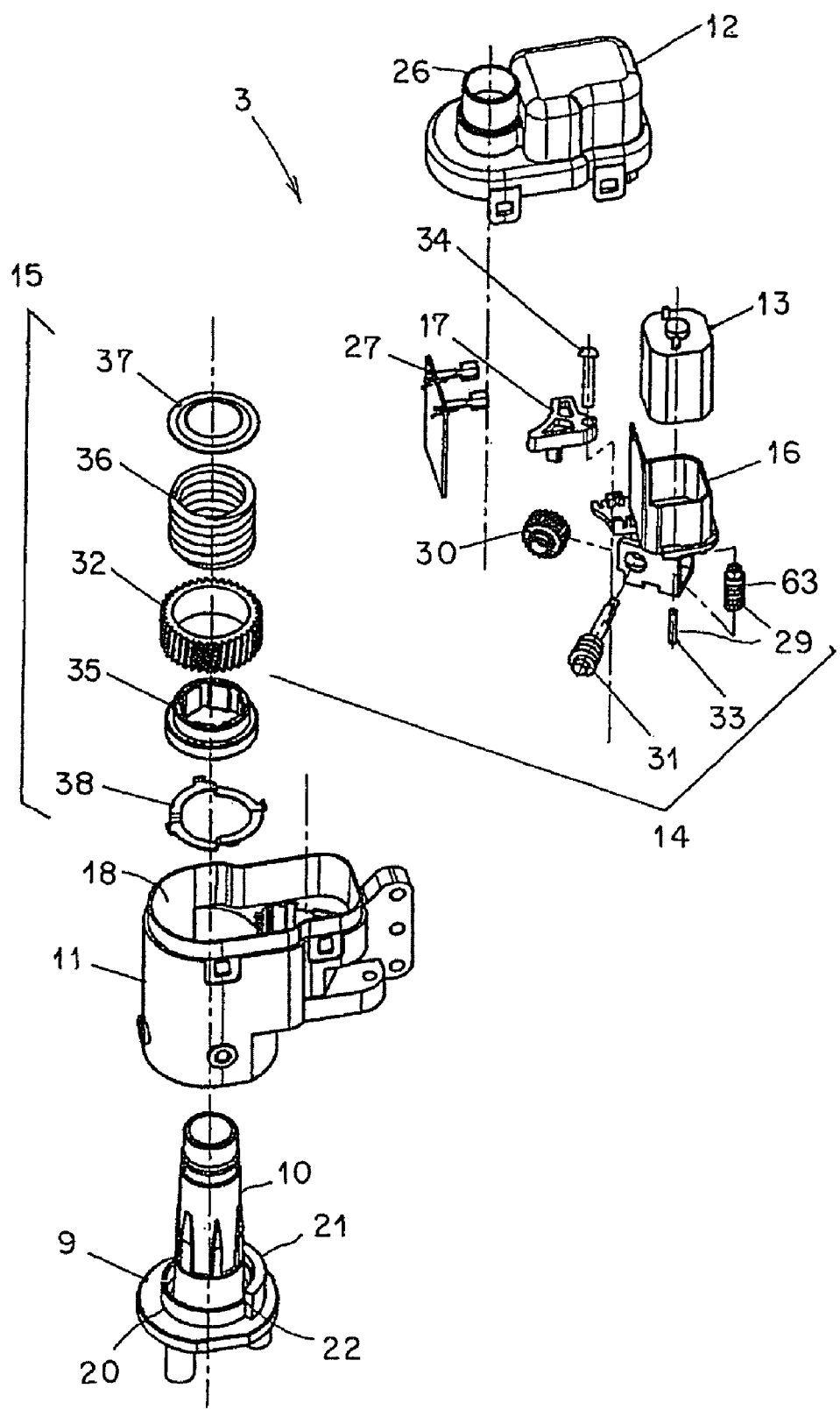
FIG. 2 is an exploded perspective view of an electric retracting unit shown in FIG. 1.

As shown in FIGS. 1 and 2, the electric retracting unit 3 includes a shaft holder 9, a shaft 10, a gear case 11, a cover 12, a motor 13, a deceleration mechanism 14, a clutch mechanism 15, a plate 16, and a fixing plate 17.

The gear case 11 and the cover 12 serve as a casing, and the deceleration mechanism 14 and the clutch mechanism 15 serve as a rotational force transmitting mechanism.

The shaft holder 9 is fixed to the base 4, and the shaft 10 is integrally provided to the shaft holder 9. The shaft 10 is formed in a hollow, and a harness (not shown) is inserted through the hollow. The gear case 11 and the cover 12 are rotatably attached to the shaft 10. The attachment bracket 6 is attached to the gear case 11. The motor 13, the deceleration mechanism 14, the clutch mechanism 15, the plate 16, and the fixing plate 17 are housed in a housing 18 formed by the gear case 11 and the cover 12.

As shown in FIGS. 2 to 6, 10, 11, 13, and 14, the gear case 11 is closed on the lower side (the side of the shaft holder 9) and is open on the upper side (the side of the cover 12) to form a concave shape in section. An insertion hole 19 is formed in the closed portion of the gear case 11, into which the shaft 10 is inserted. With this configuration, the gear case 11 is rotatably attached to the shaft 10.

Figure 3:
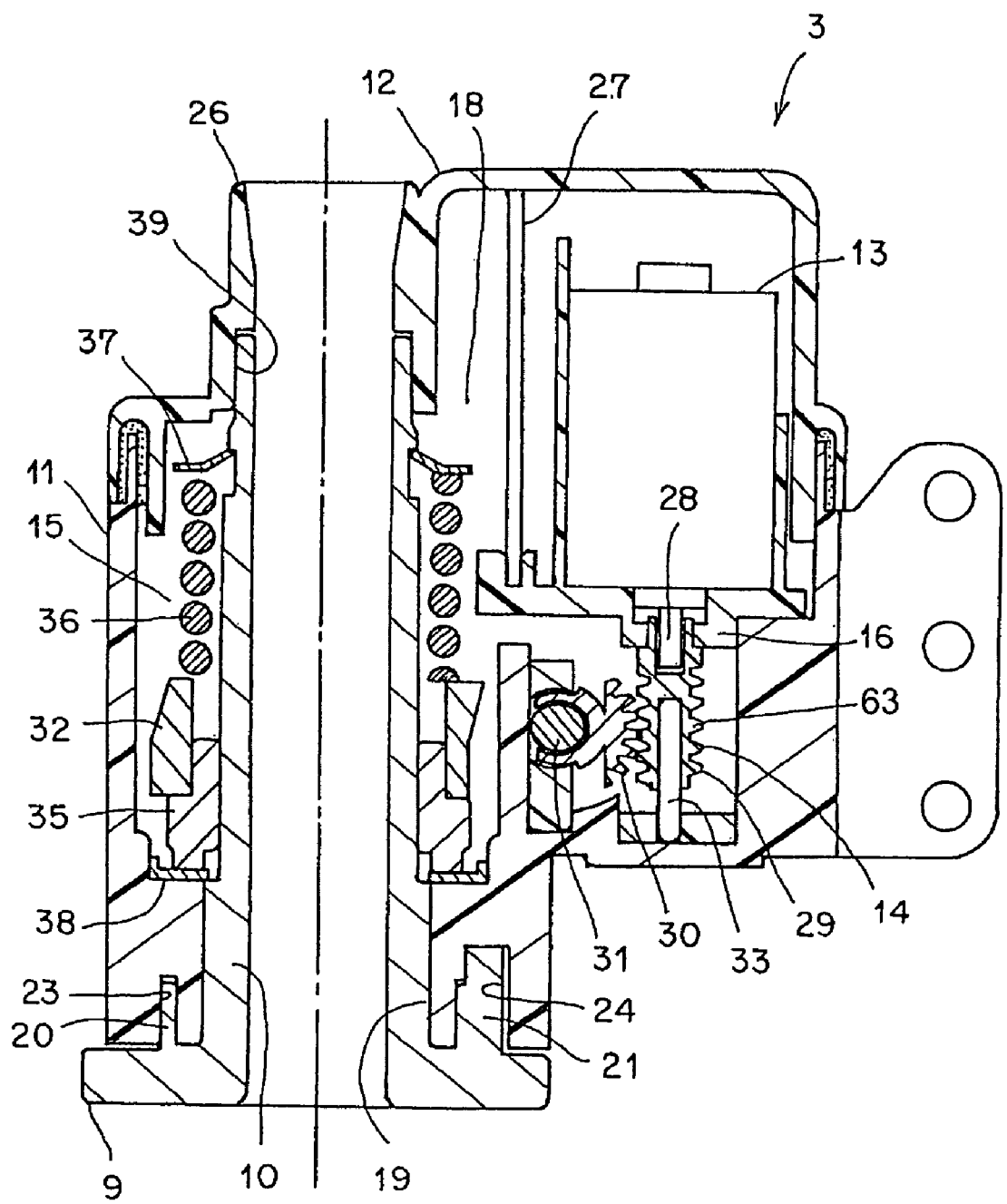
FIG. 3 is a vertical cross section of the electric retracting unit.
Figure 4:
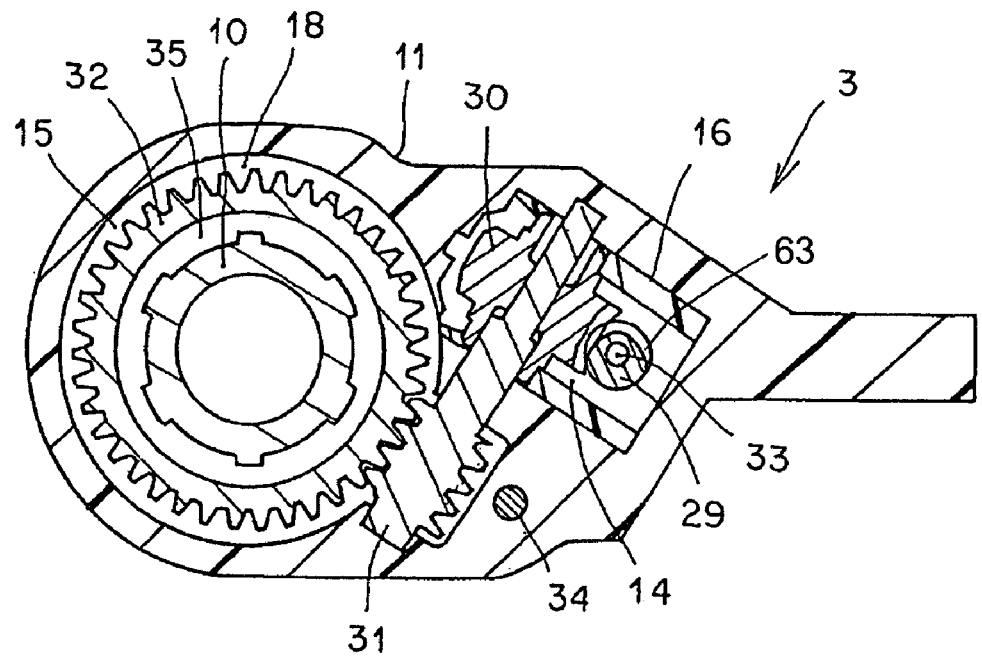
FIG. 4 is a horizontal cross section of the electric retracting unit.
Figure 5:
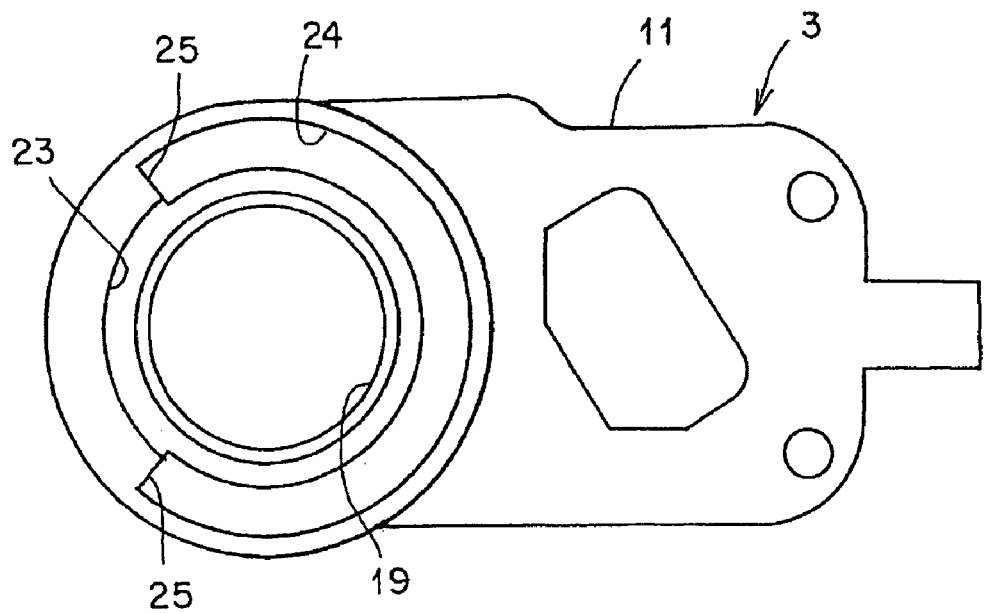
FIG. 5 is a bottom view of a gear case of the electric retracting unit.
Figure 6:
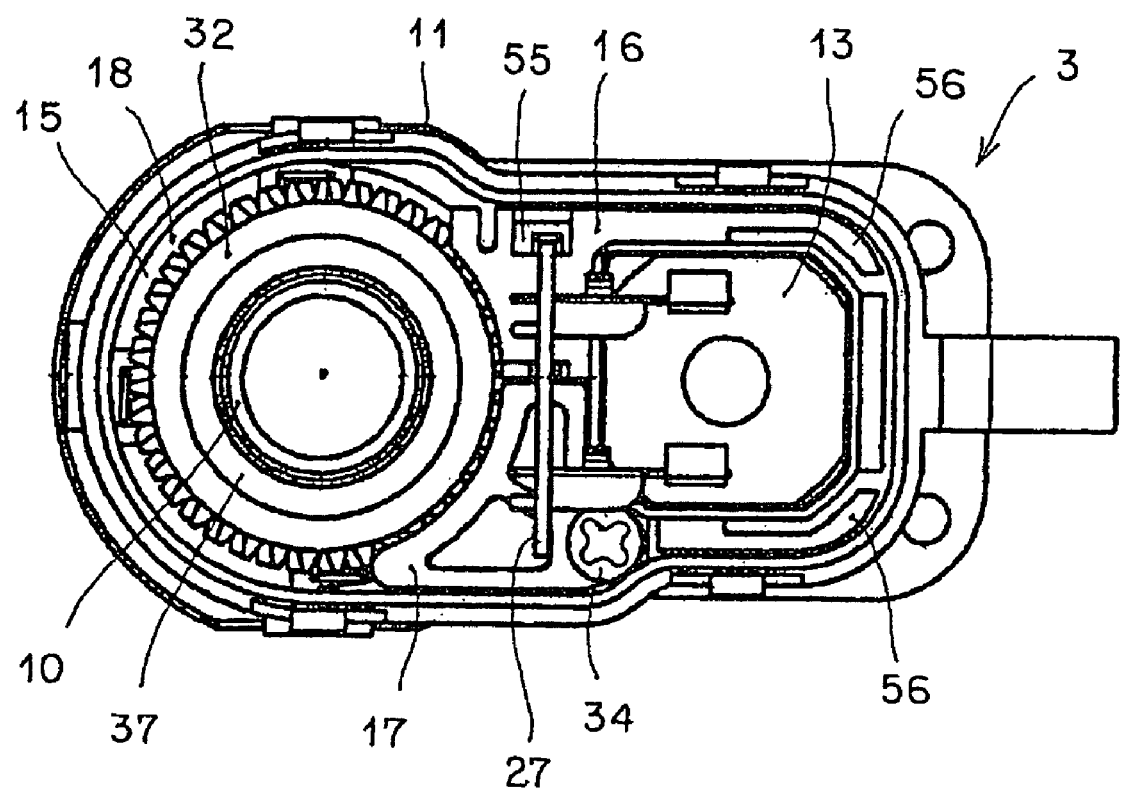
FIG. 6 is a plan view of the electric retracting unit with a cover removed.
Figure 7:
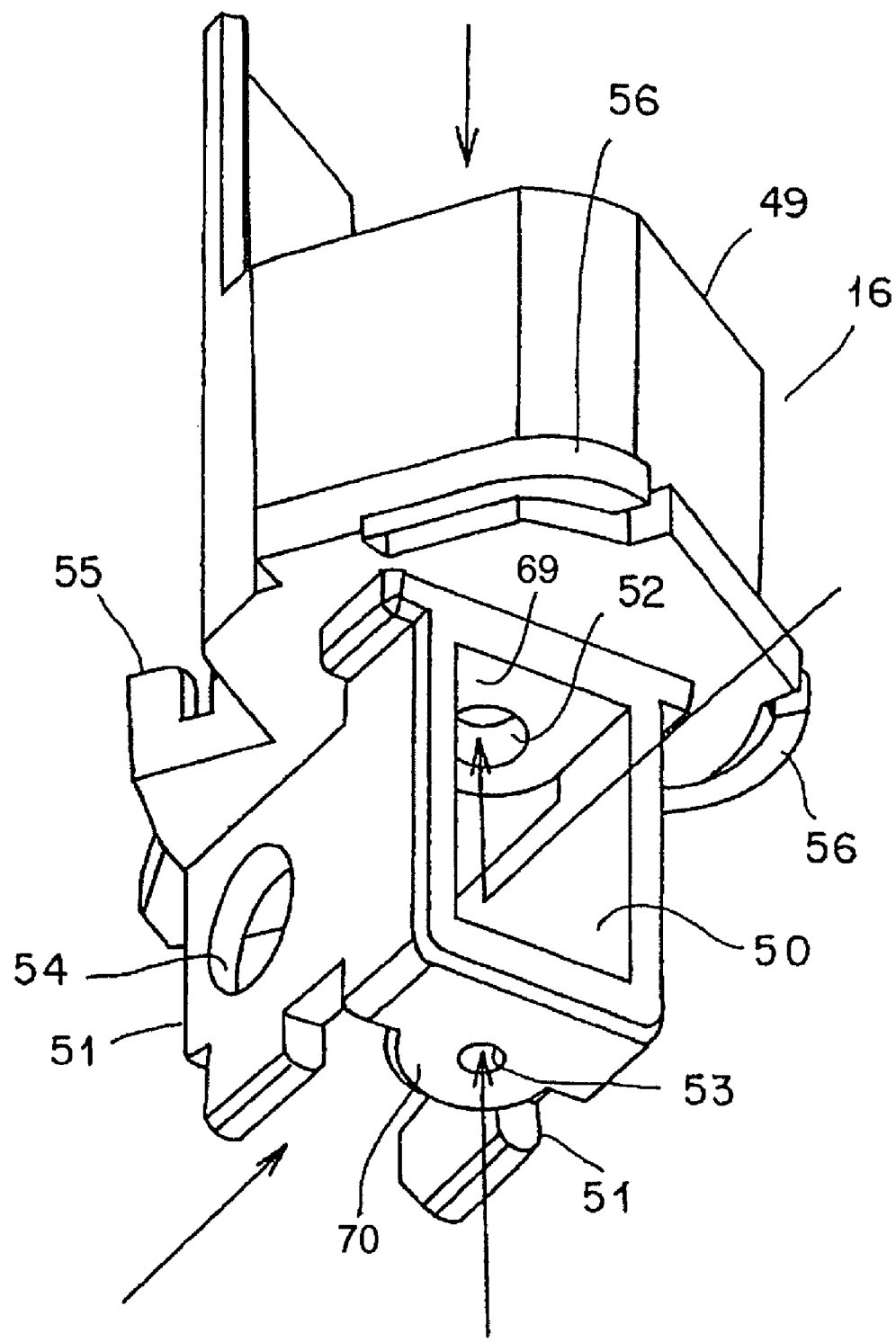
FIG. 7 is a perspective bottom view of a plate that functions as a bearing member shown in FIG. 2.

As shown in FIGS. 2 and 3, a circular guide projection 20 and an arc-shaped stopper projection 21 are integrally provided on the upper surface of the shaft holder 9. The arc-shaped stopper projection 21 is positioned outside the guide projection 20. The stopper projection 21 has stopper surfaces 22 on both ends. In FIG. 2, only one stopper surface 22 is shown. As shown in FIGS. 3 and 5, a circular guide groove 23 and an arc-shaped guide groove 24 are provided on the lower surface of the gear case 11. The guide groove 24 is positioned outside the guide groove 23 and has a width wider than that of the guide groove 23. Stopper surfaces 25 are provided at step portions formed between the guide grooves 23 and 24. The guide projection 20, the stopper projection 21, the guide groove 23, and the guide groove 24 are arranged around the shaft 10 in a concentric pattern.

The guide projection 20 and the stopper projection 21 on the shaft holder 9 are engaged with the guide groove 23 and the guide groove 24 of the gear case 11, respectively. When the mirror assembly 2 rotates with respect to the base 4, i.e., when the gear case 11 rotates with respect to the shaft holder 9, the guide grooves 23 and 24, the guide projection 20, and the stopper projection 21 function as a guide for the rotation of the gear case 11.

As shown in FIG. 1, when the mirror assembly 2 rotates forward (counterclockwise) or backward (clockwise) from a normal position C for use in driving a vehicle to get to a mirror position A in which the mirror assembly 2 is inclined forward or a mirror position B in which the mirror assembly 2 is retracted, the stopper surface 25 comes into contact with the stopper surface 22 of the stopper projection 21. Thus, the rotation of the mirror assembly 2 is restricted, so that the mirror assembly 2 does not hit the vehicle body.

As shown in FIGS. 2, 3, 7, 8, 10, and 11, the cover 12 is closed on the upper side and is open on the lower side (the side of the gear case 11) to form an inverted concave shape in section. A harness-through cylindrical portion 26 that communicates with the shaft 10 is integrally provided to the cover 12. The cover 12 is fitted and fixed to the outside edge of the opening of the gear case 11.

The motor 13, the deceleration mechanism 14, the clutch mechanism 15, the plate 16, the fixing plate 17, and a substrate 27 are housed in the housing 18. The substrate 27 is attached to the plate 16, and a switch circuit (not shown), which controls the motor 13, is mounted on the substrate 27.

An insertion hole 39 is formed in the cover 12 so that the shaft 10 is inserted through the insertion hole 39 to reach the harness-through cylindrical portion 26. With this configuration, the cover 12 is rotatably attached to the shaft 10 together with the gear case 11.

As shown in FIGS. 2 to 4, 6, 7, and 10, the deceleration mechanism 14 and the clutch mechanism 15 that function as the rotational force transmitting mechanism are housed in the housing 18 so that they are arranged between a gear shaft 28 of the motor 13 and the shaft 10. The deceleration mechanism 14 and the clutch mechanism 15 transmit a rotation force of the motor 13 to the shaft 10. In other words, the motor 13, the deceleration mechanism 14, and the clutch mechanism 15 rotate the mirror assembly 2 with respect to the shaft 10.

The deceleration mechanism 14 includes a first worm gear 29 as a first stage gear, a helical gear 30 as a second stage gear meshing with the first worm gear 29, a second worm gear 31 as a third stage gear, and a clutch gear 32 as a final stage gear meshing with the second worm gear 31.

The first worm gear 29 is rotatably supported by the plate 16 through a pin 33. The first worm gear 29 is coupled to the gear shaft 28. The helical gear 30 is rotatably supported by the plate 16. The second worm gear 31 is rotatably supported by the gear case 11 and the fixing plate 17. The fixing plate 17 is fixed to the gear case 11 with a screw 34. The helical gear 30 and the second worm gear 31 are coupled to be integrally rotatable.

The clutch mechanism 15 includes the clutch gear 32, a clutch holder 35, a spring 36, a push nut 37, and a washer 38. The clutch mechanism 15 is formed by sequentially fitting the washer 38, the clutch holder 35, the clutch gear 32, and the spring 36 over the shaft 10, and fixing the push nut 37 to the shaft 10. The spring 36 is in a compressed state. The clutch gear 32 and the clutch holder 35 are intermittently coupled to each other. The second worm gear 31 meshes with the clutch gear 32, so that a rotational force of the motor 13 is transmitted to the shaft 10.

Figure 8:
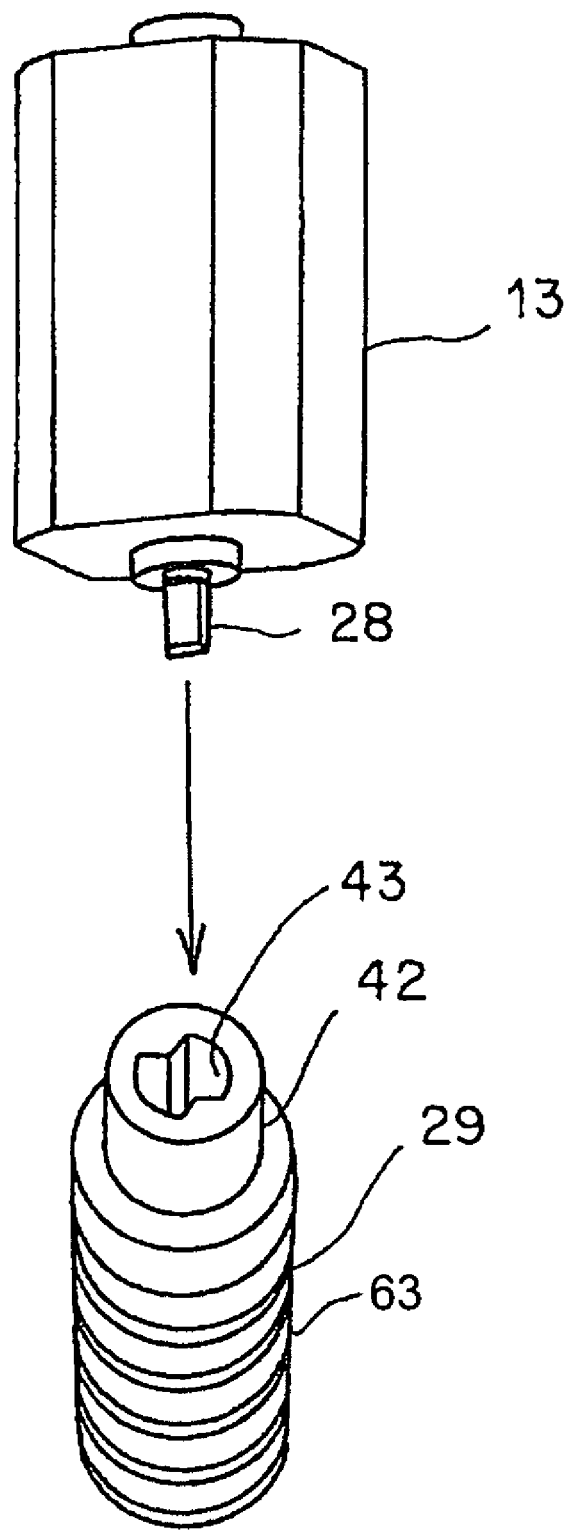
FIG. 8 is a schematic diagram for explaining a process of inserting a gear shaft of a motor into a coupling hole in a first worm gear.

As shown in FIGS. 2 to 4, and 8 to 11, the first worm gear 29 includes the pin 33 serving as a shaft, a gear portion 63, and a shaft portion 42 that is integrally provided to one end of the gear portion 63. A coupling hole 43 is formed in the shaft portion 42 to extend from one end surface of the gear portion 63 in an axis direction. The coupling hole 43 has a butterfly-like shape in cross section in a direction perpendicular to the axis direction of the gear portion 63. The gear shaft 28 has a flat plate shape. As shown in FIG. 8, the gear shaft 28 is inserted into the coupling hole 43 in the shaft portion 42, so that the gear shaft 28 is coupled to the gear portion 63.

A circular fitting hole 44 is formed in the other end of the gear portion 63 to extend in the axis direction. Because the pin 33 has a simple shape, i.e., the pin 33 is a round bar with both ends hemispherically shaped, the pin 33 is manufactured at low cost. The pin 33 is fitted into the fitting hole 44 to the degree that the pin 33 does not come off easily from the fitting hole 44 in view of a sub-assembly structure. The pin 33 can be fitted into the fitting hole 44 more loosely or more tightly.

As shown in FIGS. 2 to 4, and 12 to 14, the helical gear 30 includes a gear portion 64 and shaft portions 45. The shaft portions 45 are formed integrally with both ends of the gear portion 64 via step portions 46. A circular coupling hole 47 is formed in the helical gear 30 to penetrate therethrough in an axis direction. The inner surface in the middle of the coupling hole 47 forms two non-curved surfaces 65. The surfaces 65 are, for example, flat surfaces substantially parallel to each other.

As shown in FIGS. 2 to 4, 13, and 14, the second worm gear 31 includes a shaft portion 48 and a gear portion 66 that is provided at one end of the shaft portion 48. The shaft portion 48 and the gear portion 66 are integrated. A spherical projection 67 is integrally provided on each end of the second worm gear 31. The outer surface at the other end of the shaft portion 48 includes two non-curved surfaces 68. The surfaces 68 are, for example, flat surfaces substantially parallel to each other. The shaft portion 48 is inserted into the coupling hole 47, so that the shaft portion 48 and the coupling hole 47 are coupled to each other such that the shaft portion 48 can move in the axis direction and cannot rotate freely due to the fitting of the surfaces 65 and 68.

As shown in FIGS. 2, 3, 6, 7, 9 to 14, the plate 16 has a substantially flat plate-like shape and closes the opening of the gear case 11. The plate 16 integrally includes a motor housing portion 49, a partition plate 69, a first worm gear housing portion 50, a substrate attaching portion 55, and elastic holding portions 56. The motor housing portion 49 is provided on one side (upper side) of the partition plate 69, and the first worm gear housing portion 50 is provided on the other side (lower side) of the partition plate 69. The substrate 27 is attached to the substrate attaching portion 55. A bearing hole 52 is formed in the partition plate 69, which is provided between the motor housing portion 49 and the first worm gear housing portion 50, for rotatably supporting the shaft portion 42. The first worm gear housing portion 50 integrally includes elastic plates 51 and a lower wall (bottom wall) 70. A bearing hole 53 for rotatably supporting the pin 33 is formed in the lower wall 70. Bearing holes 54 for supporting the shaft portions 45 are formed in the elastic plates 51, respectively. The motor 13, the first worm gear 29, the helical gear 30, and the plate 16 are sub-assembled.

As shown in FIGS. 2, 6, 10, 11, 13, and 14, the fixing plate 17 is a member different from the plate 16. The fixing plate 17 includes radial bearing portions 57 on the side opposing the gear case 11. The fixing plate 17 is fixed to the gear case 11 with the screw 34, so that the radial bearing portions 57 support both ends of the second worm gear 31 together with the gear case 11. In other words, the radial bearing portions 57 and the gear case 11 suppress the radial force (the force in a radial direction) on both ends of the shaft portion 48 to stabilize the second worm gear 31.

As shown in FIGS. 10, 11, 13, and 14, the gear case 11 is provided with a concave portion 40 in which the first worm gear housing portion 50 is housed.

Figure 10:
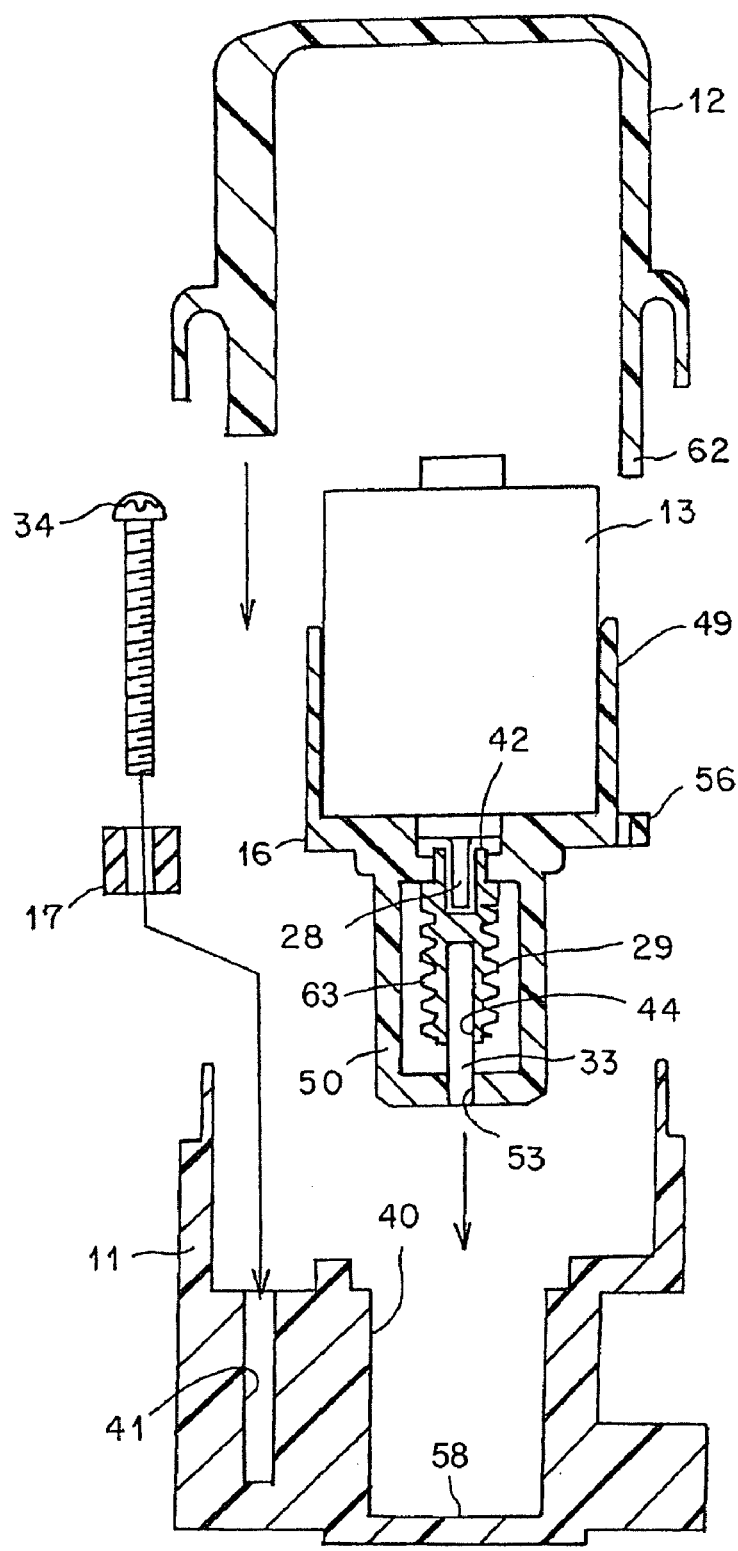
FIG. 10 is a schematic diagram for explaining a process of assembling a sub-assembly, in which the plate, the motor, and the first worm gear with the pin are assembled, to a gear case, and a process of fixing a fixing plate to the gear case.
Figure 11:
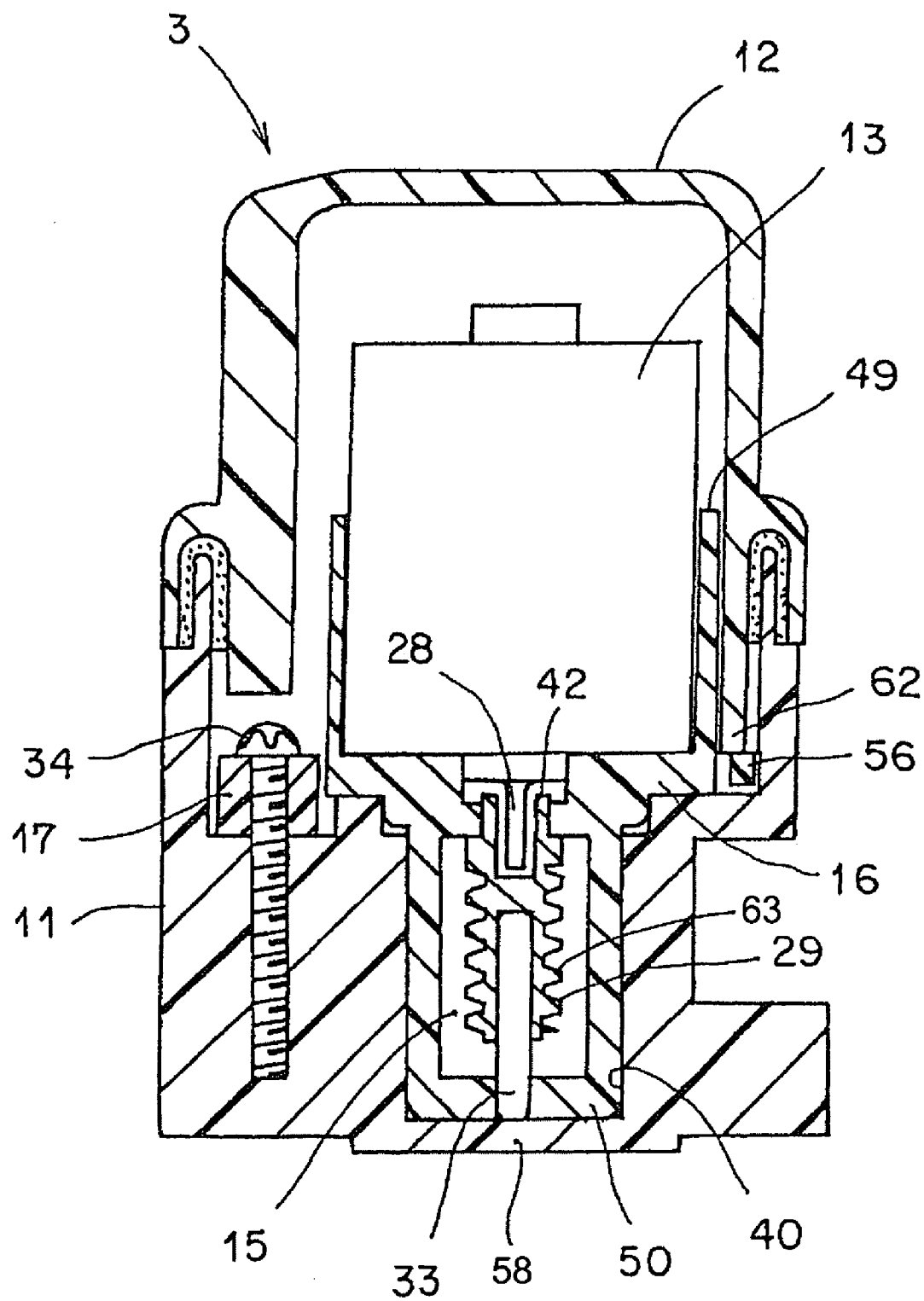
FIG. 11 is a schematic diagram for explaining a state where the sub-assembly shown in FIG. 10 and the fixing plate are housed in a housing formed by the gear case and the cover.

As shown in FIGS. 10 and 11, a pin retaining portion 58 is provided at the bottom of the concave portion 40. Furthermore, a hole 41 is formed in the gear case 11. Upon fixing the fixing plate 17 to the gear case 11 with the screw 34, the screw 34 is screwed into the hole 41.

Figure 13:
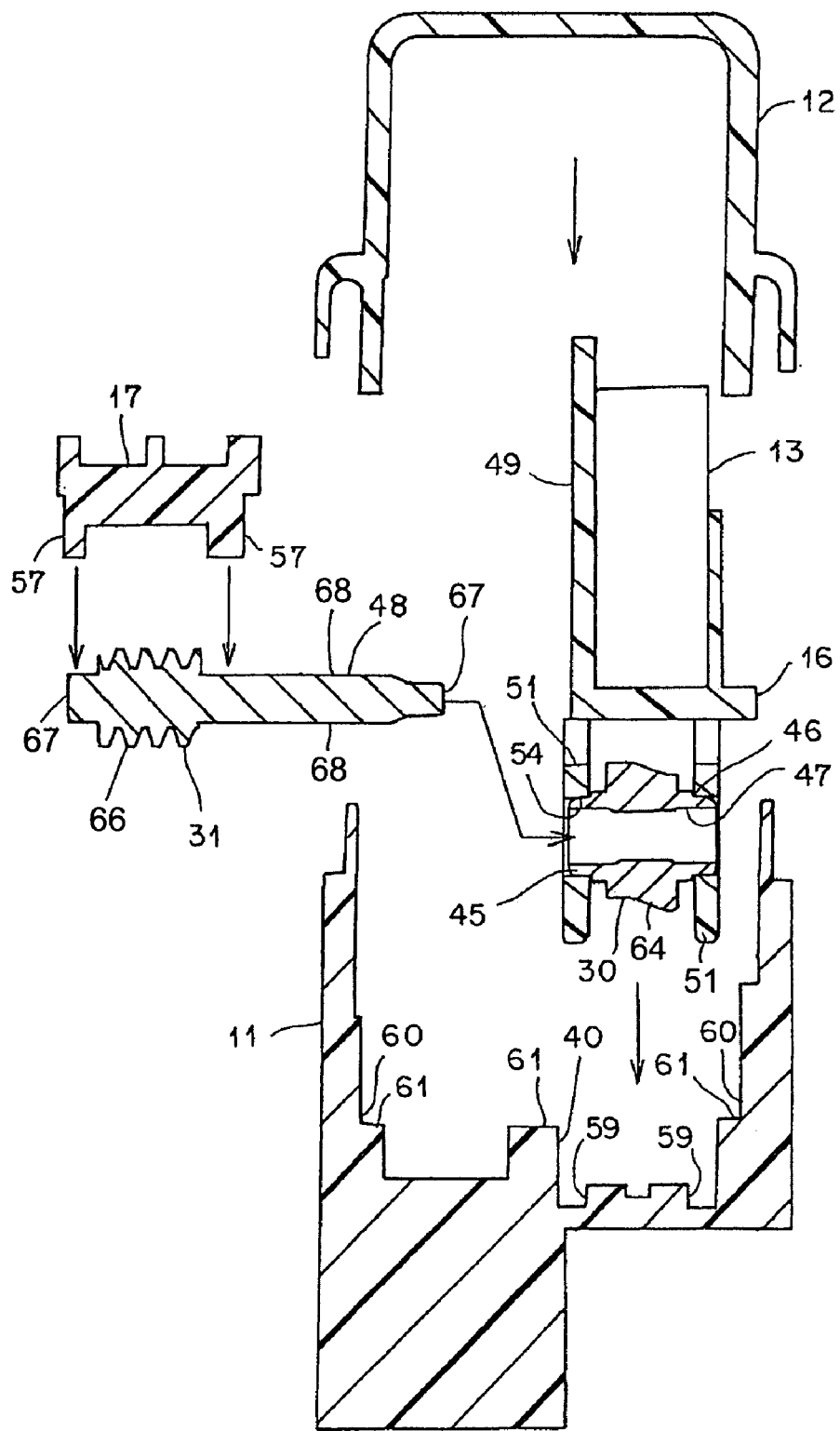
FIG. 13 is a schematic diagram for explaining a process of assembling a sub-assembly, in which the plate, the motor, and the helical gear are assembled, to the gear case, a process of coupling a second worm gear to the helical gear, and a process of fixing the fixing plate to the gear case.
Figure 14:
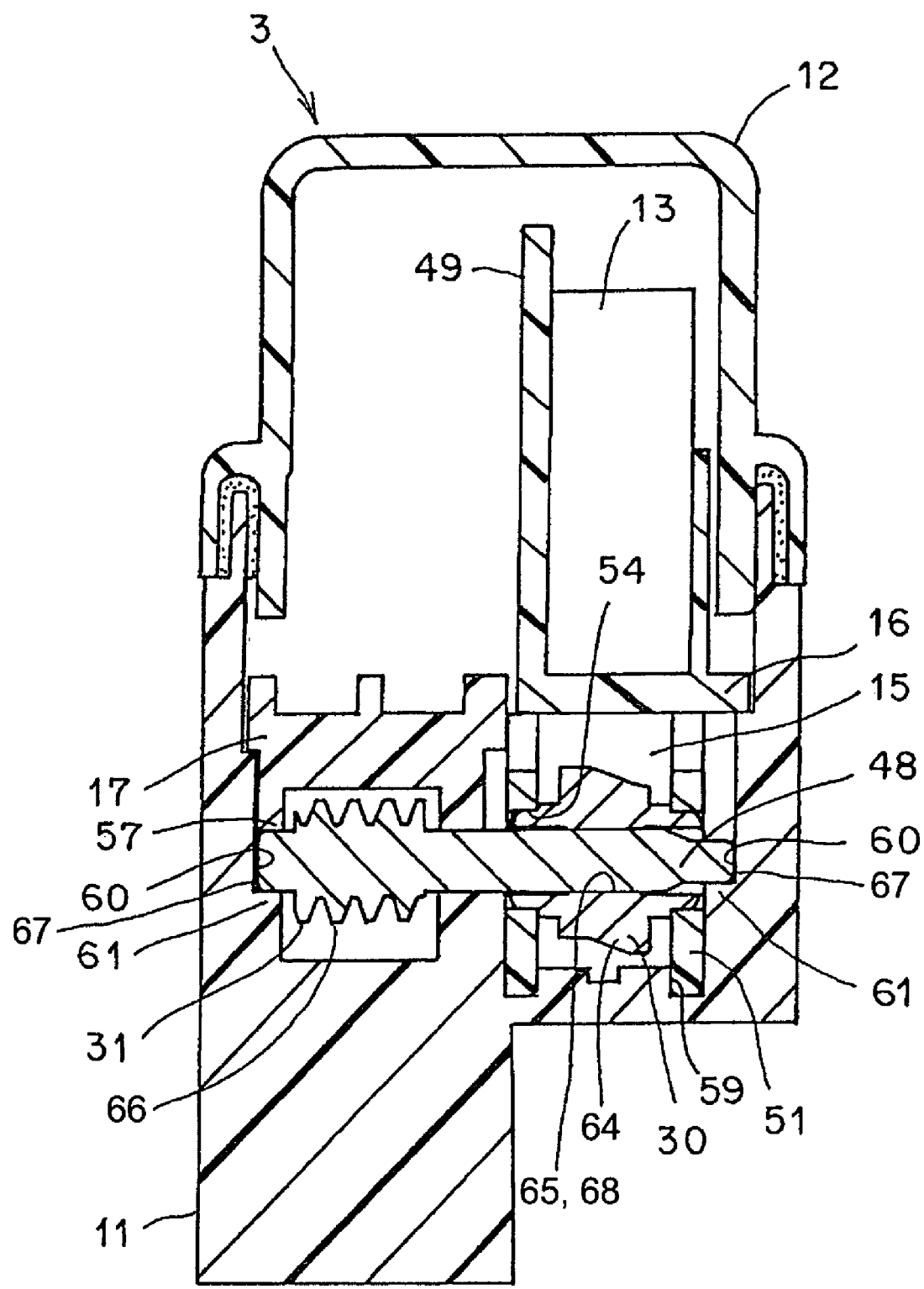
FIG. 14 is a schematic diagram for explaining a state where the sub-assembly shown in FIG. 13, the second worm gear, and the fixing plate are housed in the housing formed by the gear case and the cover.

As shown in FIGS. 13 and 14, grooves 59 are formed on the bottom of the concave portion 40. The elastic plates 51 of the plate 16 are inserted into the grooves 59. The gear case 11 includes thrust bearing portions 60. The thrust bearing portions 60 receive the thrust force (the force in a thrust direction) acting on the spherical projections 67. Furthermore, the gear case 11 includes radial bearing portions 61. The radial bearing portions 61 receive the radial force acting on the second worm gear 31.

As shown in FIGS. 10 and 11, the cover 12 includes holding portions 62 that hold the elastic holding portions 56.

A process of assembling the gear case 11, the cover 12, the motor 13, the deceleration mechanism 14, the plate 16, and the fixing plate 17 in the electric retracting unit 3 is explained below.

Figure 9:
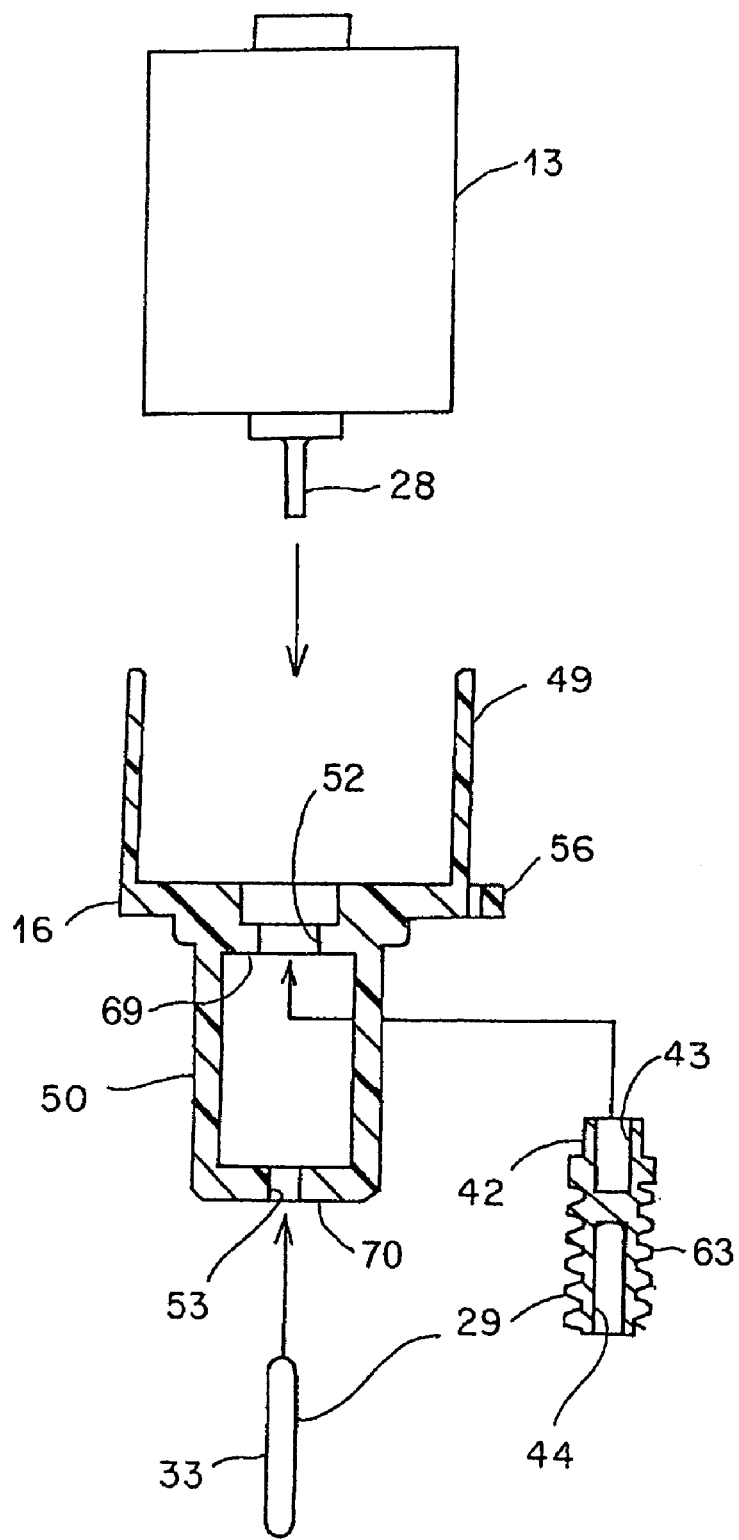
FIG. 9 is a schematic diagram for explaining a process of assembling the motor and the first worm gear to the plate.
Figure 12:
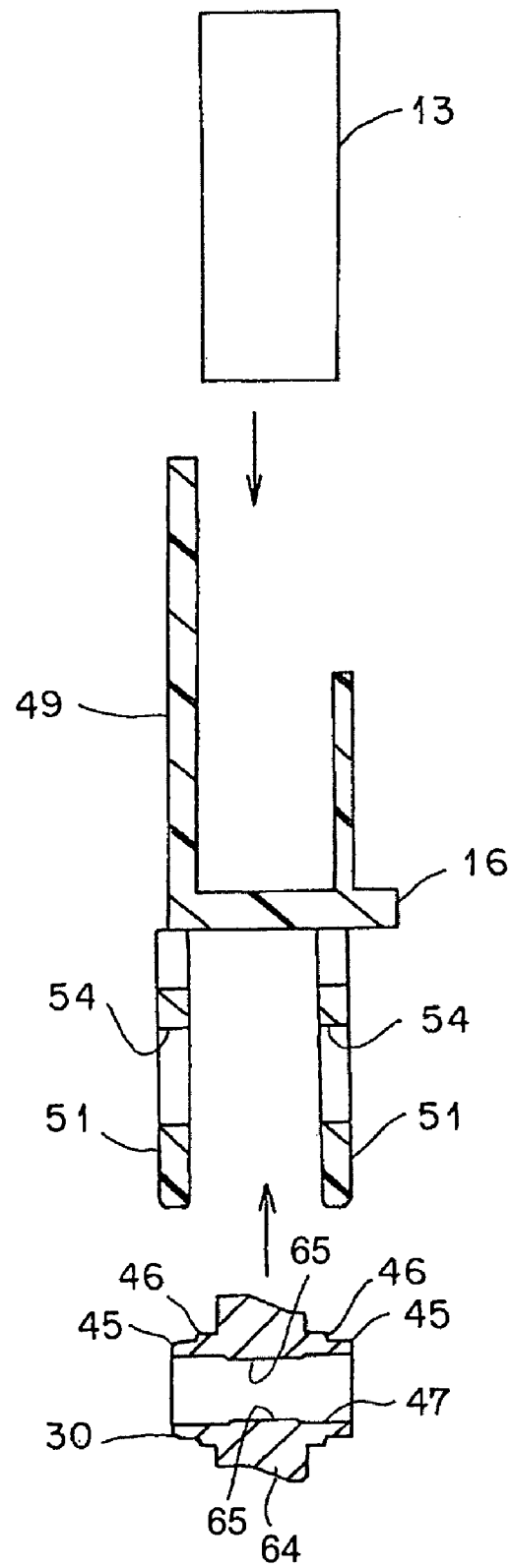
FIG. 12 is a schematic diagram for explaining a process of assembling the motor and a helical gear to the plate.

First, as shown in FIGS. 9 and 12, the motor 13 is housed in the motor housing portion 49. Then, as shown in FIG. 9, the gear portion 63 is housed in the first worm gear housing portion 50, and the shaft portion 42 is rotatably supported by the bearing hole 52 in the plate 16. The gear shaft 28 is inserted into the coupling hole 43, so that the gear shaft 28 is coupled to the gear portion 63. The order of the above operations is not limited. As shown in FIG. 9, the pin 33 is rotatably supported by the bearing hole 53 in the plate 16, and is inserted into the fitting hole 44 in the gear portion 63. Consequently, the gear portion 63 is rotatably supported by the plate 16 via the pin 33.

Subsequently, as shown in FIG. 12, the shaft portions 45 are rotatably supported by the bearing holes 54 in the elastic plates 51, respectively. At this time, the edges of the bearing holes 54 in the elastic plates 51 come into elastically close contact with the step portions 46 of the shaft portions 45 in such a manner to sandwich the step portions from outside. The first worm gear 29 and the helical gear 30 are meshed with each other. Thus, as shown in FIGS. 10 and 13, the motor 13, the first worm gear 29, the helical gear 30, and the plate 16 are sub-assembled.

Subsequently, as shown in FIG. 13, the shaft portion 48 is inserted into the coupling hole 47 in the helical gear 30 so that the shaft portion 48 is coupled to the helical gear 30 to be movable in the axis direction and not to be freely rotatable. As shown in FIG. 10, the first worm gear housing portion 50 is housed in the concave portion 40 so that, as shown in FIG. 13, the elastic plates 51 are inserted into the grooves 59. Simultaneously, the spherical projections 67 are thrust-supported by the thrust bearing portions 60, and both ends and the middle portion of the second worm gear 31 are radially supported by the radial bearing portions 61.

Subsequently, as shown in FIGS. 10 and 11, the fixing plate 17 is fixed to the gear case 11 with the screw 34. Whereby, one end and the middle portion of the second worm gear 31 are radially supported by the radial bearing portions 57 and two of the three radial bearing portions 61. The radial force acting on the shaft portion 48 is suppressed by the radial bearing portions 57 and the radial bearing portions 61. The pin 33 comes into close contact with the pin retaining portion 58. Thus, the pin 33 is prevented from coming off from the plate 16, and the shaft portion 42 is prevented from coming off from the bearing hole 52.

Subsequently, the shaft 10 is inserted into the insertion hole 19 in the gear case 11 to be rotatable. The washer 38, the clutch holder 35, the clutch gear 32, the spring 36, and the push nut 37 of the clutch mechanism 15 are assembled to the shaft 10.

Finally, as shown in FIGS. 10 and 13, the cover 12 is fitted and fixed to the outside edge of the opening of the gear case 11, and the holding portions 62 are made in close contact with the elastic holding portions 56. Whereby, the plate 16, to which the first worm gear 29 and the helical gear 30 are sub-assembled, is elastically held by the gear case 11 and the cover 12.

The gear case 11, the cover 12, the motor 13, the deceleration mechanism 14, the plate 16, and the fixing plate 17 are assembled as shown in FIGS. 11 and 14, and the shaft holder 9, the shaft 10, and the clutch mechanism 15 are assembled as shown in FIG. 3. Thus, the assembling of the electric retracting unit 3 is completed.

The gear case 11 of the electric retracting unit 3 is attached to the attachment bracket 6. The shaft holder 9 is fixed to the base 4. Thus, the assembling of the door mirror device 1 is completed. The door mirror devices 1 are mounted on the vehicle door by fixing the bases 4 to the right and left sides of the vehicle door.

For actuating the door mirror device 1, first, the motor 13 is driven by operating a switch (not shown) in the vehicle. The rotational force of the motor 13 is transmitted to the clutch gear 32 fixed to the shaft 10 via the gear shaft 28 and the deceleration mechanism 14. At this time, because the clutch gear 32 is nonrotatable with respect to the shaft 10, the second worm gear 31 rotates around the clutch gear 32 centering on the shaft 10. With the rotation of the second worm gear 31, the mirror assembly 2 with the electric retracting unit 3 built in rotates between the normal position C and the mirror position B centering around the shaft 10 as shown in FIG. 1. When the mirror assembly 2 reaches the normal position C or the mirror position B, the current flowing into the motor 13 is cut off by a switching operation by the switch circuit (not shown), and the mirror assembly 2 stops at the normal position C or the mirror position B.

When a load is applied to the mirror assembly 2 from the front side or the rear side, the clutch gear 32 rotates against the pressing force of the spring 36, and the mesh engagement between the clutch gear 32 and the clutch holder 35 is released. Whereby, the clutch of the clutch mechanism 15 is released, and the mirror assembly 2 rotates between the normal position C and the mirror position B, or between the normal position C and the mirror position A, for absorbing a shock. When the mirror assembly 2 is manually rotated from forward or backward, the clutch by the clutch mechanism 15 is released and the mirror assembly 2 rotates between the normal position C and the mirror position B, or between the normal position C and the mirror position A, in the same manner as the above.

According to the embodiment, the shaft portions at both ends of the first stage gear in the rotational force transmitting mechanism, i.e., the shaft portion 42 and the pin 33 of the first worm gear 29, are supported by the bearing holes 52 and 53 in the plate 16 as a single bearing member, respectively. Thus, the rotational central axis of the first worm gear 29 can be properly positioned. Therefore, the axial runout and the inclination of the first worm gear 29 are reliably prevented. This reduces an operation noise, resulting in improving a commercial value of the door mirror device 1. In addition, the first stage gear (the first worm gear 29), which is coupled to the gear shaft 28 and rotates at high speed, can exhibit improved durability.

Furthermore, according to the embodiment, the shaft portion 42 is inserted into the bearing hole 52 in the plate 16, and the pin 33 is inserted into the bearing hole 53 in the plate 16 and the fitting hole 44 in the first worm gear 29. Thus, the shaft portion 42 and the pin 33 can be supported by the bearing hole 52 and the bearing hole 53 in the plate 16 as a single bearing member, respectively. Therefore, efficiency of assembling the first worm gear 29 to the plate 16 is improved.

Moreover, according to the embodiment, the first worm gear 29 is directly coupled to the gear shaft 28. Thus, a joint for coupling the first worm gear 29 to the motor 13 is not required, which results in reducing the number of parts of the door mirror device 1, thereby lowering manufacturing cost of the door mirror device 1.

Furthermore, according to the embodiment, the first worm gear 29 and the helical gear 30 that meshes with the first worm gear 29 are supported by the plate 16 as a single bearing member. Thus, the rotational central axes of the first worm gear 29 and the helical gear 30 can be properly positioned, so that the relative positional relationship between the rotational central axes of the first worm gear 29 and the helical gear 30 can be appropriate. Therefore, the axial runout and the inclination of the first worm gear 29 and the helical gear 30 are reliably prevented, and the pitch between axes of the first worm gear 29 and the helical gear 30 becomes stabilized. This reduces the operation noise, resulting in improving a commercial value of the door mirror device 1. In addition, the first stage gear (the first worm gear 29), which is coupled to the gear shaft 28 and rotates at high speed, can exhibit improved durability.

Moreover, according to the embodiment, the motor 13, the first worm gear 29, the helical gear 30, and the plate 16 are sub-assembled. Thus, efficiency of assembling the motor 13, the deceleration mechanism 14, and the plate 16 is improved. In addition, efficiency of assembling the sub-assembly in which the motor 13, the first worm gear 29, the helical gear 30, and the plate 16 are assembled, to other parts such as the gear case 11, the cover 12, the clutch gear 32, and the clutch mechanism 15, is improved.

Particularly, because the plate 16, which rotatably supports the first worm gear 29 coupled to the gear shaft 28 and the helical gear 30, and the fixing plate 17, which suppresses the radial force acting on the second worm gear 31 that meshes with the clutch gear 32, are different members, the radial force acting on the second worm gear 31 does not affect the plate 16. For example, because displacement or deformation of the fixing plate 17 due to the radial force acting on the second worm gear 31 is not transmitted to the plate 16, the first worm gear 29 and the helical gear 30, which are supported by the plate 16, are not affected. Thus, the first worm gear 29, the helical gear 30, the second worm gear 31 can rotate smoothly and properly. Consequently, the operation noise can be reduced, and the strength of the gears does not decline because the gears mesh with each other properly, thereby improving the quality and the commercial value of the door mirror device 1. In other words, because the gears themselves do not need high strength, it is possible to lower manufacturing cost of the door mirror device, and durability of the gears is increased.

Furthermore, according to the embodiment, because the radial force acting on the second worm gear 31 does not affect the plate 16, the plate 16 does not need to be fixed to the gear case 11 with a screw or the like. This results in reducing the number of parts of the door mirror device 1, thereby lowering manufacturing cost of the door mirror device 1 and improving efficiency of assembling operation. Moreover, the plate 16 is elastically held by the gear case 11 and the cover 12. Thus, even though the plate 16 is not fixed to the gear case 11, the plate 16 does not rattle, and even if the movement of the second worm gear 31 due to eccentricity of the shaft is transmitted to the helical gear 30, the plate 16 follows the movement of the second worm gear 31. Therefore, the pitch and the mesh engagement between the first worm gear 29 and the helical gear 30 are not affected by the movement of the second worm gear 31.

Moreover, according to the embodiment, because the fixing plate 17 and the plate 16 are formed with separate members, the fixing plate 17 can be a small fixing plate simply having a size sufficient for suppressing the radial force acting on the second worm gear 31. In this case, no particular problem is caused by providing the fixing plate 17 and the plate 16 as separate members.

In the embodiment described above, the present invention is applied to the electric retractable door mirror device. However, the present invention can be applied to other vehicle mirror devices including vehicle outside mirror devices such as a vehicle fender mirror.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An outside mirror device for a vehicle, the outside mirror device including a mirror assembly that is rotatably attached to a body of the vehicle through an electric retracting unit and a base, wherein the electric retracting unit includes a shaft holder that is fixed to the base,
a shaft that is provided on the shaft holder,
a casing to which the mirror assembly is attached, the casing rotatably attached to the shaft,
a motor that outputs a rotational force,
a rotational force transmitting mechanism that transmits the rotational force to the mirror assembly, and
a bearing member that rotatably supports a first stage gear of the rotational force transmitting mechanism coupled to a shaft of the motor, the first stage gear includes
a gear portion having a fitting hole at a first end thereof,
a pin that is fitted into the fitting hole, and
a shaft portion provided at a second end of the gear portion, the bearing member includes bearing holes that support the shaft portion and the pin, respectively, and the casing includes a pin retaining portion that prevents the pin from coming off.

2. The outside mirror device according to claim 1, wherein the first stage gear is directly coupled to the shaft of the motor.

3. The outside mirror device according to claim 1, wherein
the rotational force transmitting mechanism includes the first stage gear and a second stage gear that meshes with the first stage gear,
the second stage gear includes shaft portions at both ends,
the bearing member includes elastic plates having bearing holes, respectively, and
the shaft portions of the second stage gear are rotatably supported by the bearing holes of the elastic plates, respectively.

4. The outside mirror device according to claim 3, wherein the motor, the gear portion and the pin of the first stage gear, the second stage gear and the bearing member are sub-assembled.

* * * * *